Figure 1:
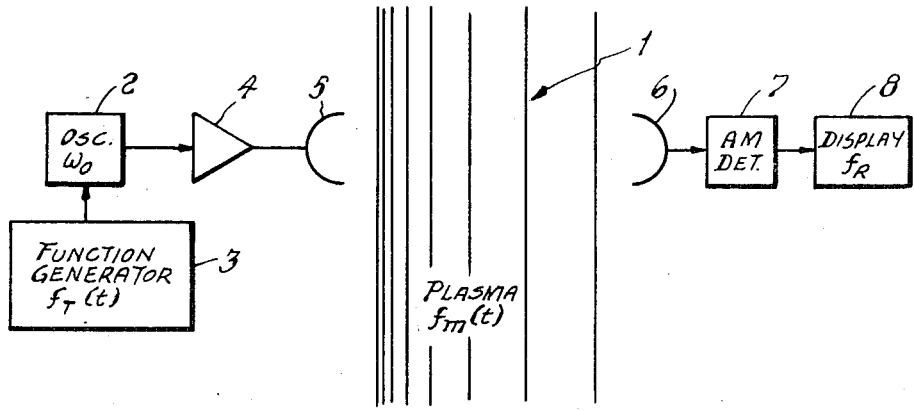

United States Patent

[11] 3,599,089

| [72] | Inventor | Dimitri S. Bugnolo<br>Portsmouth, R.I. |
|---|---|---|
| [21] | Appl. No. | 844,531 |
| [22] | Filed | July 24, 1969 |
| [45] | Patented | Aug. 10, 1971 |
| [73] | Assignee | The United States of America as represented by the Secretary of the Navy |

[54] GRADIENT SOUNDER
2 Claims, 5 Drawing Figs.

[52] U.S. Cl. .................................................. 324/58.5,
324/71 R, 315/111, 73/170
[51] Int. Cl. ...................................................... G01r 27/04
[50] Field of Search .......................................... 324/58,
58.5, 71; 315/111; 73/170

[56] References Cited
UNITED STATES PATENTS

| 2,971,153 | 2/1961 | Wharton | 324/58.5 |
| 3,265,967 | 8/1966 | Heald | 324/58.5 |

*Primary Examiner*—Michael J. Lynch
*Attorneys*—R. I. Tompkins, L. I. Shrago and R. K. Tendler ABSTRACT: This invention describes a method for determining the density gradient of a plasma by directing a frequency modulated electromagnetic wave through the plasma, detecting the amplitude of this wave as it emerges from the plasma and measuring the minimum width of the detected amplitude peak as the FM modulation function is changed so as to correspond to the inverse of the spreading function of the plasma.

INVENTOR
DIMITRI S. BUGNOLO

GRADIENT SOUNDER

The invention described herein may be manufactured and used by or for the Government of the United States of America for governmental purposes without the payment of any royalties thereon or therefor.

This invention relates to the direct measurement of electron or ion density gradients in either laboratory produced or naturally occurring plasmas and, more specifically, to a method for determining this gradient by measuring the minimum pulse width of a set of signals which have interacted with the plasma.

The term "pulse width" refers to the width of a pulse which is generated by AM detection of an FM signal varied about a mid or center frequency. When the detected signal is displayed on an amplitude versus time graph, various nodal points occur. The time distance between the principal nodal points is the pulse width for purposes of this patent. When an FM signal is made to radiate through a plasma, the function of the frequency variation of the FM signal may be changed until a minimum pulse width received signal is obtained. When this minimum pulse width is observed, it has a direct relationship to the density of the plasma and as such is a direct indication of the plasma density gradient.

When an electromagnetic wave passes through a plasma of the type to be described, certain components of the wave are refracted, reflected and attenuated both as a function of the density of the plasma and as a function of turbulence and magnetic fields so as to cause a phase shifting of a portion of the wave detected. This phase shifting can be visualized in terms of a time delay due to differing path lengths through the medium. It is the finding of this invention that the density gradient is to a first order approximation responsible for this time delay when a minimum pulse width is detected. Because of the time delayed paths, the amplitude of the wave is attenuated by either full or partial phase cancellation in the plasma. The amplitude versus time graph of the wave emerging from the plasma is characterized by a central amplitude peak and minor peaks displaced on either side of the central peak. When the width of this central amplitude peak is made minimum, its width is directly proportional to the density gradient because the effects of the varying path lengths due to miscellaneous time delays have been canceled out. In order to obtain this minimum width, the electromagnetic wave must be frequency modulated by a function $f_T(t)$ which is the inverse of the time delay function $f_m(t)$ of the plasma. To a first order approximation, $f_m(t)$ may be a linear function, a sinusoidal function or an exponential function depending on the composition of the plasma. It will be appreciated that $f_m(t)$ is, in fact, an extremely complex function whose inverse would be extremely difficult to generate. First order approximations do, however, give better results than multiple probing of the plasma.

Having decided that a given plasma may be characterized by a linear $f_m(t)$ function, for example, the constants of that $f_T(t)$ which corresponds to the linear $f_m(t)$ are systematically varied until a minimum pulse width is obtained. It will be appreciated that changing the above-mentioned constants corresponds to changing the bandwidth of the particular FM function, $f_T(t)$, used.

Plasmas are generally defined to be an ionized gas in which ions and electrons are partially or completely dissociated. These plasmas may be artificially produced by electromagnetically superheating gases or may exist naturally as the dissociated ions and electrons in the earth's atmosphere. Prior methods of measuring density gradients of electrons or ions in these plasmas have been difficult because they subsume uniformity of the plasma. This assumption is necessary because the prior art methods sample density in only one region. Samplings in more than one region either further disturb the flow field of a moving plasma in the case of physical probes or require multiple measurements over a large area. Amongst the more well-known probe methods are the Langmuir probe and the impedance probe. In both these probes, multiple locations must be used to obtain a density gradient. CW or monochromatic electromagnetic waves can be used to measure this gradient only if the gradient is confined and uniform since this method utilizes an averaging process. Indirect measurements of electron density gradients can also be made by fixed frequency pulsed electromagnetic radiation. These measurements are restricted to the immediate vicinity of the plasma frequency or, in the presence of a magnetic field, to the vicinity of the critical frequency for a particular mode. A measurement at more than one point is then performed by a change in frequency to measure the density at other modal points. All of these techniques measure electron or ion gradients under very special circumstances. Such circumstances rarely exist in geophysical applications.

In recent geophysical experiments, a moving plasma formed by the earth's atmosphere is used to generate electric power. These devices, called magnetohydrodynamic power generators, depend on the movement of a plasma between two electrodes and a moving magnetic field. The feasibility of airborne generators of this type depends on exact knowledge of the plasma density gradients to predict the amount of power deliverable at given altitudes. In such applications, average plasma density measurements are acceptable if they are reasonably accurate. Although the present invention allows such accurate measurements to be made over a large area, the present invention may be used for both laboratory produced and naturally occurring plasmas.

In general, this invention describes a method of measuring directly the electron or ion density gradient of an entire inhomogeneous plasma having a considerable spatial extend by measuring the minimum pulse width of a set of FM signals which has propagated through a large portion of the plasma.

The major feature of this invention is the matching of the function of this FM signal to the inverse of the "spreading function" of the plasma. When these are matched, the pulse width of the signal received from the plasma is at a minimum. When this minimum has been achieved by systematically varying the modulator of the FM transmitter, its width will be proportional to the electron or ion density gradient of the plasma with which it interacts.

The spreading function which describes the manner in which a particular plasma affects the incident wave is related to the electron or ion density gradient of the plasma. This spreading function can be duplicated by varying the modulation function of the FM transmitter. Once the function of the transmitter matches the inverse of the function of the plasma, the broadening induced by the plasma is counteracted and a narrow line or minimum pulse if produced. A measurement of the resultant minimum pulse width thus indicates the gradient without the necessity of the plasma being uniform or stationary. This technique is thus especially useful for measuring ion and electron density gradients in either the ionosphere or deep space where uniform densities do not occur naturally.

In order to measure the gradients in a plasma, the frequency output of a stable oscillator is frequency modulated over a confined bandwidth. The magnitude of the frequency modulation is varied until the above-mentioned minimum pulse width is obtained. The output of the oscillator is amplified and transmitted to a suitable radiator which directs the modulated radiation towards a plasma. The frequency versus time characteristics of this radiation are effected by the frequency dependent time delay resulting from the electron density gradient. The radiation is subsequently detected by an AM detector and displayed as an amplitude versus frequency plot. The width of the envelope of this plot is measured and the density gradient obtained therefrom.

It is therefore an object of this invention to provide a method for measuring the electron or ion density gradient of a plasma by measuring the pulse width of electromagnetic radiation which has been first given a predetermined frequency modulation and has been subsequently propagated through the plasma.

Figures 2A, 2B, 2C:
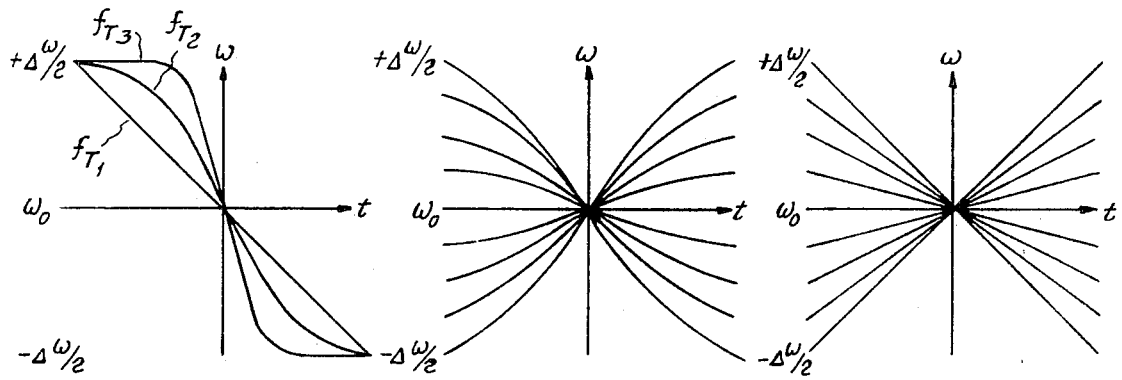
Figure 3:
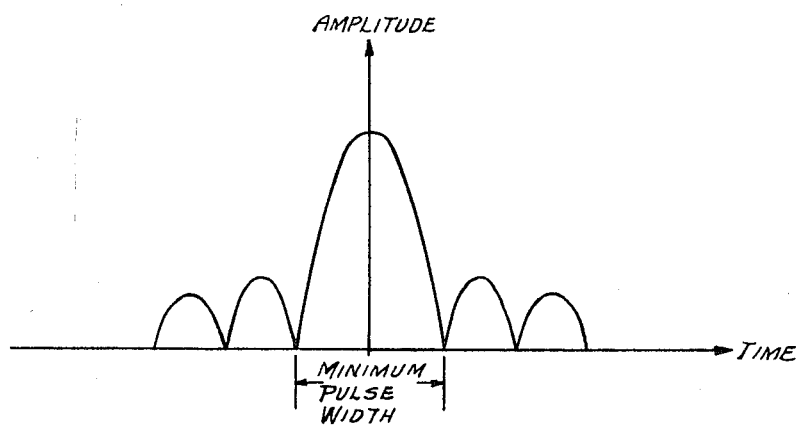

Other objects, advantages and novel features of the invention will become apparent from the following detailed descrip- FIG. 1 is a diagrammatic representation of the density gradient measuring system showing a transmitting and a detecting system on either side of an inhomogeneous plasma;

FIGS. 2a, b and c are graphs showing possible modulation functions for the function generator in FIG. 1; and FIG. 3 is a graph showing the major and minor envelopes of the amplitude of the detected signal from which the ion or electron density gradient can be computed.

Referring to FIG. 1, an inhomogeneous plasma 1 is shown flanked by a transmitter consisting of a stable oscillator 2, function generator 3, amplifier 4 and antenna 5 and a receiver consisting of a receiving antenna 6, an AM detector 7 and a display 8.

The plasma is said to be inhomogeneous in that the distribution of either electrons or ions is not uniform throughout the plasma. An assumption about the distribution in the plasma is, however, made. In planes perpendicular to a line between antennas 5 and 6, the distribution of the electrons or ions is assumed to be uniform. This assumes that the plasma is, in fact, layered in nature. The density from layer to layer may vary at random but the distribution in each layer is assumed to be uniform. If this were not assumed, the term "density gradient" would not be well defined. The most available example of such a plasma is the atmosphere surrounding the earth. For layers of the earth's atmosphere, the distribution of ions or electrons is for the most part uniform and thus conforms to the above assumption. Laboratory plasmas may or may not conform to this assumption depending on the way in which they are generated. Plasmas which are currently susceptible of confinement in magnetic fields show a certain amount of turbulence. Confinement techniques have now, however, advanced to the point of eliminating these flow anomalies from the plasma. These plasmas are thus sufficiently uniform in the direction of flow to allow density gradient measurements by the subject method. In practice, the problem of tangential uniformity can be decreased by confining the electromagnetic wave to a narrow cone.

A characteristic of plasmas is that they interact with electromagnetic waves of a given frequency. This given frequency is called the resonant frequency of the plasma. In laboratory generated plasmas, this frequency is easily ascertained since it is usually the pumping frequency, the most efficient RF frequency at which energy is delivered to the gas. For naturally occurring plasmas, the resonant frequency depends on the types of electrons and/or ions making up the plasma. This resonant frequency can be obtained experimentally or from a knowledge of the densities involved. This frequency will be referred to as $\omega_p$, whether experimentally or theoretically derived. For the purposes of this patent application, $\omega_o$ is the pumping frequency or the center frequency of the wave energy directed into the plasma and is made to equal $\omega_p$, defined above.

In one characterization, the plasma may be said to be acting on the impinging signal according to some function $f_m(t)$. This may be a linear function operating on $\omega_o$ when $\omega_o$ equals $\omega_p$ in the region of interest. $f_m(t)$ may, however, be a complex function operating on $\omega_o$. The complexity may be due to doppler shifting generated by a plasma moving with respect to the transmitting source. It may also be due to the interaction of the plasma with either a natural or artificially produced magnetic field.

Every plasma can be characterized by its own unique spreading function $f_m(t)$. If the inverse of this spreading function is frequency modulated into the impinging signal, the spreading function will be canceled. The pulse width of the signal leaving the plasma will thus be related only to the density gradient of the plasma and will be independent of doppler and magnetic shifts. By measuring the pulse width of this emerging signal, an average gradient can be derived.

In order to duplicate the spreading function, a stable variable frequency oscillator 2 is used. Since the modulated bandwidth is small as compared with the center frequency $\omega_o$ of the oscillator, its unmodulated stability is critical. The output of the oscillator is amplified without frequency distortion by amplifier 4 and introduced into a suitable antenna 5 which directs the resultant electromagnetic radiation to the plasma. The frequency of oscillator 2 is varied cyclically by function generator 3. The signal from this function generator thus has a function $f_T(t)$ which then becomes the FM function of the transmitted electromagnetic wave. This function can be varied by either increasing or decreasing the frequency deviation of the function generator or by changing the function. Different functions are shown in FIGS. 2a, b and c. These functions are generated merely by changing the frequency deviation of generator 3. As can be seen from FIGS. 2a, b and c, the frequency range can vary in as many ways as there are different settings of the function generator. If the function generator is swept through a range of frequencies until a received minimum pulse width is obtained, the AM detector 7 need only have a bandwidth capability equal to the magnitude of the sweep. In FIGS. 2b and c, this is $\pm\Delta\omega/2$ for the maximum sweep. While the spreading function $f_m(t)$ may be complex, first order matching can usually be achieved by the above modulation system. Receiving antenna 6 is most effectively located either within the plasma or on the same side as the transmitting antenna to receive reflected radiation. In the case of atmospheric or deep space measurements, the receiving antenna may be positioned so as to receive backscattered radiation from the plasma taking into account a double time delay and thus a different $f_T(t)$.

Display 8 is basically any device which displays amplitude as a function of time. Since the detector is a simple AM detecting device, its output can drive the display directly. The display would then consist of a uniform time base to drive the abscissa and a linear amplifier to drive the ordinate from the output.

The drawings in FIG. 2 are possible modulation functions of the function generator. In these figures, $\omega_o$ is the center frequency of the oscillator and $\Delta\omega$ is the maximum bandwidth of the signal.

FIG. 2a shows three possible modulation functions: $f_{T_1}(t)$, being linear; $f_{T_2}(t)$, a sinusoidal function; and $f_{T_3}(t)$, an exponential function, all having the same maximum bandwidth. Choice of which of these functions which will yield the best minimum pulse width is a matter of empirical discovery with each new plasma. It is possible that none of the above three functions will yield a minimum pulse width due to the complexity of $f_m(t)$ of the plasma. To a first order approximation, ionospheric plasmas will conform to one of the above functions. Having chosen one of the three functions, its bandwidth is systematically changed in order to obtain the best minimum. These changes are shown by the interior function lines in FIGS. 2b and 2c.

The FM transmitter may put out a continuous signal into the plasma or it may be pulsed. If it is a pulsed transmission and a linear function is chosen, a conventional chirp generator may be used as the function generator shown in FIG. 1.

In FIG. 3, the width of the minimum pulse at the output of detector 7 is related to the density gradient of the plasma in a manner which depends on the type of signal generated by the function generator. Having obtained that function which produces the minimum pulse at the output of the detector, the gradient, $\Delta n/\Delta z$, can be determined by simple knowledge of the carrier frequency, $f_o$, and the minimum pulse width, T. For most ionospheric plasmas, $\Delta n/\Delta z \approx 4 f_o/T (\Delta X)^{11} \times 10^{13}$
where $\Delta X$ is the sample distance in the plasma and T is the time distance between the aforementioned primary nodal points that occur on either side of the central amplitude peak shown as the highest amplitude peak in FIG. 3.

The advantages of the present invention over existing methods of measuring gradients in electron or ion density are simply stated in that the gradient measurement is direct. Old methods require that the density be measured at more than one point and that the gradient then be calculated from a collection of measurements of the density itself. This can often be a laborious and difficult procedure.

It should be noted that the principle of this invention could be applied to the direct measurement of a gradient in any substance, medium, etc. The only requirement is a source of energy capable of interaction with the medium. An example of such a case would be an acoustic wave in water. In this connection, the lack of a phenomenon comparable to the plasma frequency in an ionized gas, in a medium such as water at audio frequencies, does not alter the nature of the invention. It may, however, require a separate measurement of density at one point in the region of interest.

What I claim is:

1. Apparatus for measuring the density gradient of ionized gases in the atmosphere surrounding the earth comprising in combination:
    means for directing electromagnetic wave energy upwardly from a point on the surface of the earth such that said energy passes through a portion of said atmosphere and is reflected back to said point by the gas particles in said atmosphere, said wave energy having a center frequency equal to the resonant frequency of that portion of the earth's atmosphere above said point;
    means for cyclically varying the frequency of said electromagnetic energy about said center frequency in accordance with a modulation function that is the inverse of the spreading function of that portion of the earth's atmosphere above said point;
    means for detecting the amplitude of that portion of said wave energy which is reflected back to said point; and
    means for measuring the difference in time between the occurrence of points of minimum amplitude of said detected wave energy whereby said time difference is directly proportional to said density gradient.

2. A method for measuring the density gradient of a plasma, comprising the steps of
    directing electromagnetic wave energy through said plasma, said wave energy having a center frequency equal to the resonant frequency of said plasma;
    varying the frequency of said electromagnetic wave energy about said center frequency in accordance with selected functions;
    detecting the amplitude of said electromagnetic wave energy after it has passed through said plasma;
    measuring the time interval between the occurrence of a pair of points of minimum amplitude of said detected wave energy which are symmetrically spaced about the point in time corresponding to the occurrence of the highest amplitude peak of said detected wave energy, this minimum time interval occurring when the frequency of said electromagnetic wave energy is being varied in accordance with a function which is the inverse of the spreading function of said plasma so that said minimum time interval is directly proportional to said density gradient.